United States Patent
Kim

(10) Patent No.: US 6,670,940 B2
(45) Date of Patent: Dec. 30, 2003

(54) FLAT PANEL DISPLAY AND DRIVE METHOD THEREOF

(75) Inventor: Jong-Seon Kim, Pyeongtaek (KR)

(73) Assignee: Samsung Electronics Co., Ltd., Suwon (KR)

( * ) Notice: Subject to any disclaimer, the term of this patent is extended or adjusted under 35 U.S.C. 154(b) by 147 days.

(21) Appl. No.: 09/928,350

(22) Filed: Aug. 14, 2001

(65) Prior Publication Data

US 2002/0075214 A1 Jun. 20, 2002

(30) Foreign Application Priority Data

Dec. 16, 2000 (KR) ........................................ 2000-77443

(51) Int. Cl.[7] ................................................ G06G 3/36
(52) U.S. Cl. .......................................... 345/98; 345/87
(58) Field of Search .................. 345/55–100, 204–206, 345/208–212; 349/149–151

(56) References Cited

U.S. PATENT DOCUMENTS

| | | | | |
|---|---|---|---|---|
| 5,686,936 A | * | 11/1997 | Maekawa et al. | 345/100 |
| 5,973,658 A | * | 10/1999 | Kim et al. | 345/92 |
| 6,163,310 A | * | 12/2000 | Jinno et al. | 345/87 |
| 6,369,786 B1 | * | 4/2002 | Suzuki | 345/77 |
| 6,437,767 B1 | * | 8/2002 | Cairns et al. | 345/100 |
| 6,456,353 B1 | * | 9/2002 | Chen | 349/150 |

FOREIGN PATENT DOCUMENTS

JP  05-134627  * 5/1993  ............ G09G/3/36

* cited by examiner

*Primary Examiner*—Richard Hjerpe
*Assistant Examiner*—Alexander Eisen
(74) *Attorney, Agent, or Firm*—McGuireWoods LLP

(57) ABSTRACT

Disclosed is a flat panel display and a drive method thereof. The flat panel display comprises a flat panel including a signal wire arrangement for transmitting image drive signals to pixels, a row signal wire arrangement for transmitting scanning signals, and a column signal wire arrangement for transmitting image signals; a master drive output unit, the master drive output unit generating output signals for driving pixels and supplying the output signals to a corresponding signal wire arrangement; and an slave drive unit, the slave drive unit supplying compensation signals to the signal wire arrangement before the output signals of the master drive output unit are charged to thereby enable the easy charging of the output signals of the master drive output unit. The drive method comprises the steps of supplying and charging compensation signals by the slave drive unit, the compensation signals being supplied to a corresponding signal wire arrangement before the output signals of the master drive output unit are charged to thereby enable the easy charging of the output signals of the master drive output unit; and supplying output signals for the driving of pixels by the master drive output unit following the supply of the compensation signals.

11 Claims, 7 Drawing Sheets

FLAT PANEL DISPLAY AND DRIVE METHOD THEREOF

BACKGROUND OF THE INVENTION (a) Field of the Invention

The present invention relates to a flat panel display and a drive method thereof, and more particularly, to a flat panel display with a large screen and high resolution and a drive method thereof.

(b) Description of the Related Art

There is an ever-increasing effort of research to improve existing flat panel displays and develop new flat panel display configurations. Flat panel displays include the widely used liquid crystal display; plasma display panels, which are emissive like CRTs and so have an excellent viewing angle and color performance; and electroluminescent displays, which have a significantly better refresh rate than the CRT.

Flat panel displays typically include a flat panel on which a matrix of cells formed between two glass substrates is arranged, a PCB module for driving the flat panel, and a case for protecting and integrating these elements. In the LCD, the cells are not realized through luminous elements but instead through shutter switches. Accordingly, a back light unit must be provided to the rear of the liquid crystal panel.

The PCB modules in flat panel displays receive and process R, G, B image data and synchronization signals, then provide image data, scanning signals, and timing control signals to the flat panel. Accordingly, the PCB module acts as a drive circuit to enable the flat panel to perform the normal display of computer images, television images, etc. The PCB module is realized through a plurality of PCBs and a plurality of flexible printed cables (FPCs), which are used for the transmission of signals between the PCBs.

FIG. 1 shows a schematic block diagram of a prior art flat panel display, and FIG. 2 shows a PCB module of FIG. 1. As shown in the drawings, a PCB module for driving a flat panel 40 at a relatively low resolution (e.g., the SVGA standard of 600 by 800 pixels) includes a main PCB 10 for receiving R, G, B image data and synchronization signals, and processing the data and signals using a timing controller, which is a FPGA (flat pin grid array) custom IC, and for processing the image data and various control signals in a manner suitable for the structure of the flat panel 40; a row driver PCB 20 to which there is attached a row driver IC TAB (tape automated bond) 90, the row driver PCB 20 supplying scanning signals to a row signal wire according to row driver control signals received from the main PCB 10; and a column driver PCB 30 to which there is attached a column driver IC TAB (tape automated bond) 100, the column driver PCB 30 receiving image data and control signals processed in the main PCB 10, and supplying the image data to the flat panel 40. Further, an FPC 70 is provided to transmit row driver control signals 50 and 51 generated by the main PCB 10 to the row driver PCB 20, and an FPC 80 is provided to transmit column driver control signals 60 and 61 generated by the main PCB 10 to the column driver PCB 30.

However, with reference to FIG. 3, when image signals are supplied to a column signal wire 120 of the flat panel 40, a control unit operates by receiving control signals generated in a timing controller T-con of the main PCB 10 of FIG. 1. A D/A converter and a buffer amp operate according to control signals of the control unit such that image signals corresponding to gray voltages (V0–V63) are output to the column signal wire 120. Accordingly, even with a sufficient current drive capacity of the D/A converter and buffer amp, a higher processing speed screen and a high resolution display, such as UXGA (1200 by 1600), QXGA (2048 by 1536), and QSXGA (2560 by 2048) distorts and delays the signals, because of the inherent resistance and stray capacity increase in the row signal wire and column signal wire 120. Therefore, the signal effectively received by the device that controls the optical performance is distorted and only a portion of the intended signal is received. Such problems cannot be easily compensated in a big screen and a high resolution display and are summarized below.

(1) Problems of large screen size and drive signal distortion

Currently produced flat panel displays employ virtually no drive technologies that can solve signal distortion. Currently, the display is designed to minimize the resistance of metal wiring, or to minimize stray capacity load stemming from structural characteristics or thin film materials that comprise pixels. This increases the effective load, which is actually used for image display, minimizing the signal distortion.

In conventional methods, it is difficult to reduce the wiring resistance to the desired level because of the material characteristics and the process limitations of the wiring material. On the other hand, development of the new wiring materials also requires technologies for the manufacturing processes. This also requires additional research and manufacturing equipment. Further, it is not possible to reduce stray capacity past a certain amount through changes in pixel structure because of necessary structural conditions that must be satisfied, as well as design and manufacturing limitations.

Because of such restrictions, it is difficult to realize a high resolution and a big screen display (an over 20-inch, UXGA standard display in the case of LCDs, and an ultra-large screen, high resolution display in the case of PDPs). Large screens commonly used these days also experience an inferior picture quality and a defective final product (beyond acceptable levels) as a result of signal distortion. Although pixel wiring short-circuit can be repaired, such signal delays and distortions cannot be repaired.

2) Compensation of drive signal distortion in prior art

At present, there are no drive technologies that compensate for or otherwise solve the problem of drive signal distortion in flat panel displays. A big screen display that may suffer visible degradition of image quality, may employ a dual scan drive method. The dual scan drive method drives a screen by dividing the screen into two in a scanning direction. Another dual drive method may apply the same image signals simultaneously to the signal wires on both sides of the panel.

The dual scanning method requires a signal processing circuit to convert the conventional signal into dual scan type signals, since image signals of an image signal transmission unit of a computer, television, etc., are single scan type signals. Such a circuit requires a large-capacity graphic data memory. As the resolution increases, the memory requirement also increases substantially. Further, since in dual scanning the drive signals are applied on both sides of the flat panel with a time difference, it is necessary to supply data signals and control signals to both sides of signal wires. This complicates the structure of the flat panel display, which negatively affects production. Finally, the divided screen in the dual scan drive method may be perceptible to users, thereby deteriorating overall picture quality.

The dual drive method may not need a signal processing circuit to convert single scan signals into dual scan signals like in the dual scan method, but the need of simultaneously applying drive signals to the signal wires on both sides of the flat panel complicates overall structure. Further, although there is the advantage of circumventing errors caused by a short in the signal wires since identical image signals are supplied to both sides of the panel, drive time with an increased resolution are only minimally saved, since the flat panel is basically a single scan type.

SUMMARY OF THE INVENTION

The present invention has been made in an effort to solve the above problems.

It is an object of the present invention to provide a flat panel display and a drive method thereof, in which the flat panel display has a large screen and a high resolution, in which the problems of a complicated structure and high cost associated with a dual scan method or a dual drive method are solved, and in which a compensation circuit and a method thereof are provided for significantly reducing signal delay and distortion.

To achieve the above object, the present invention provides a flat panel display and a drive method thereof. The flat panel display comprises a flat panel including a signal wire arrangement for transmitting image drive signals to pixels, a row signal wire arrangement for transmitting scanning signals, and a column signal wire arrangement for transmitting image signals; a master drive output unit installed on one of four sides of the flat panel, the master drive output unit generating output signals for driving pixels and supplying the output signals to a corresponding signal wire arrangement; and an slave drive unit installed on a side of the flat panel opposing the side on which the master drive output unit is installed, the slave drive unit supplying compensation signals to the signal wire arrangement before the output signals of the master drive output unit are charged to thereby enable the easy charging of the output signals of the master drive output unit.

In another aspect, the present invention provides a flat panel display comprising a flat panel including a signal wire arrangement for transmitting image drive signals to pixels, a row signal wire arrangement for transmitting scanning signals, and a column signal wire arrangement for transmitting image signals; a row-side master drive output unit installed on one of four sides of the flat panel, the row-side master drive output unit generating row-side output signals for driving pixels and supplying the row-side output signals to a row signal wire arrangement; a column-side master drive output unit installed on one of four sides of the flat panel, the column-side master drive output unit generating column-side output signals for driving pixels and supplying the column-side output signals to a column signal wire arrangement; a row-side slave drive unit installed on a side of the flat panel opposing the side on which the row-side master drive output unit is installed, the row-side slave drive unit supplying compensation signals to the row-side signal wire arrangement before the output signals of the row-side master drive output unit are charged to thereby enable the easy charging of the output signals of the row-side master drive output unit; and a column-side slave drive unit installed on a side of the flat panel opposing the side on which the column-side master drive output unit is installed, the column-side slave drive unit supplying compensation signals to the column-side signal wire arrangement before the output signals of the column-side master drive output unit are charged to thereby enable the easy charging of the output signals of the column-side master drive output unit.

According to a feature of the present invention, the slave drive unit is one or more IC.

According to another feature of the present invention, the slave drive unit comprises an on/off switch for shorts or opens according to control signals to either transmit or cut off signals; a three-state buffer converter for outputting one of three voltages according to control signals; an slave buffer amp for converting signals received from the three-state buffer converter to signals of the same voltage but amplified by a predetermined current gain, and transmitting the converted signals to the on/off switch, the on/off switch either transmitting or cutting off the signals as described above; and an slave control unit for generating the control signals to control the on/off switch and the control signals to control the three-state buffer converter, and for outputting the control signals at predetermined times.

According to yet another feature of the present invention, the control signals generated by the slave control unit are generated by a timing controller installed on a master PCB of a PCB module.

According to still yet another feature of the present invention, the signal wire arrangement is a column signal wire.

According to still yet another feature of the present invention, the three voltages of the three-state buffer converter include two different DC voltages, and a floating non-voltage.

In yet another aspect, the present invention provides an slave drive unit of a flat panel display having a signal wire arrangement transmitting image drive signals to pixels, a row signal wire arrangement transmitting scanning signals, and a column signal wire arrangement transmitting image signals, an slave drive unit of the flat panel display, the slave drive unit being installed on a side of the flat panel opposite a master drive output unit, and the slave drive unit supplying compensation signals to the signal wire arrangement before output signals of the master drive output unit are charged to thereby enable the easy charging of the output signals of the master drive output unit.

The drive method for a flat panel display, in which the flat panel display includes a signal wire arrangement for transmitting image drive signals to pixel electrodes of the flat panel display, a row signal wire arrangement for transmitting scanning signals, a column signal wire arrangement for transmitting image signals, and a master drive output unit and an slave drive unit for supplying image drive signals to one of the signal wire arrangements, comprises the steps of supplying and charging compensation signals by the slave drive unit installed on a side of the flat panel opposing the side on which the master drive output unit is installed, the compensation signals being supplied to a corresponding signal wire arrangement before the output signals of the master drive output unit are charged to thereby enable the easy charging of the output signals of the master drive output unit; and supplying output signals for the driving of pixels by the master drive output unit before and following the supply of the compensation signals.

In another aspect, the drive method for a flat panel display, in which the flat panel display includes a signal wire arrangement for transmitting image drive signals to pixel electrodes of the flat panel display, a row signal wire arrangement for transmitting scanning signals, a column signal wire arrangement for transmitting image signals, and a master drive output unit and an slave drive unit respectively installed on a row side and a column side and for supplying image drive signals to one of the signal wire arrangements, comprises the steps of supplying and charging row-side compensation signals by the row-side slave drive unit installed on a side of the flat panel, the row-side compensation signals being supplied to the row signal wire arrangement before the output signals of the row-side master drive output unit are charged to thereby enable the easy charging of the output signals of the row-side master drive output unit; generating and supplying by the row-side master drive output unit, which is installed on a side of the flat panel opposing the side on which the row-side slave drive unit is installed, row-side output signals for driving pixels before and following the supply of the row-side compensation signals, the row-side output signals being supplied to the row signal wire arrangement; supplying and charging column-side compensation signals by the column-side slave drive unit installed on a side of the flat panel, the column-side compensation signals being supplied to the column signal wire arrangement before the output signals of the column-side master drive output unit are charged to thereby enable the easy charging of the output signals of the column-side master drive output unit; and generating and supplying by the column-side master drive output unit, which is installed on a side of the flat panel opposing the side on which the column-side slave drive unit is installed, column-side output signals for driving pixels before and following the supply of the column-side compensation signals, the column-side output signals being supplied to the column signal wire arrangement.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
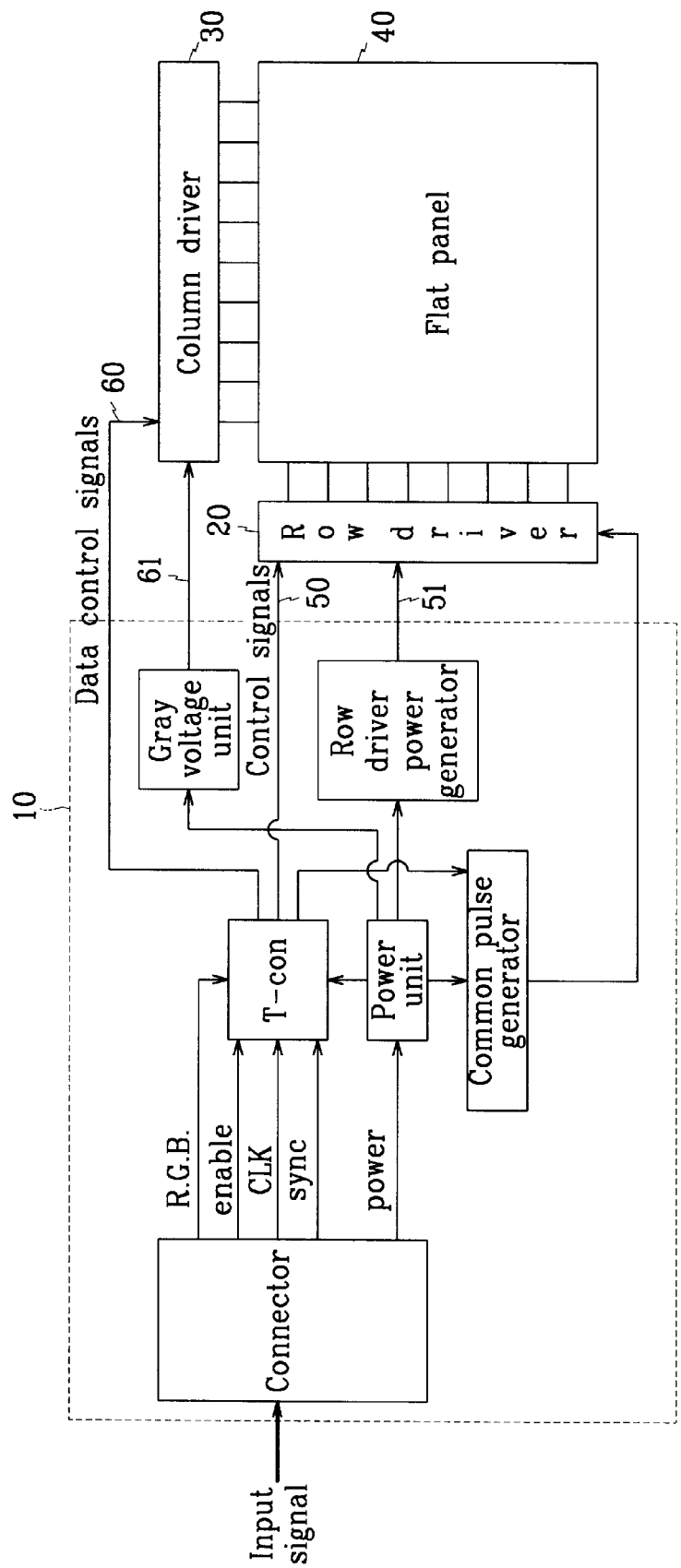
FIG. 1 is a schematic block diagram of a prior art flat panel display.
Figure 2:
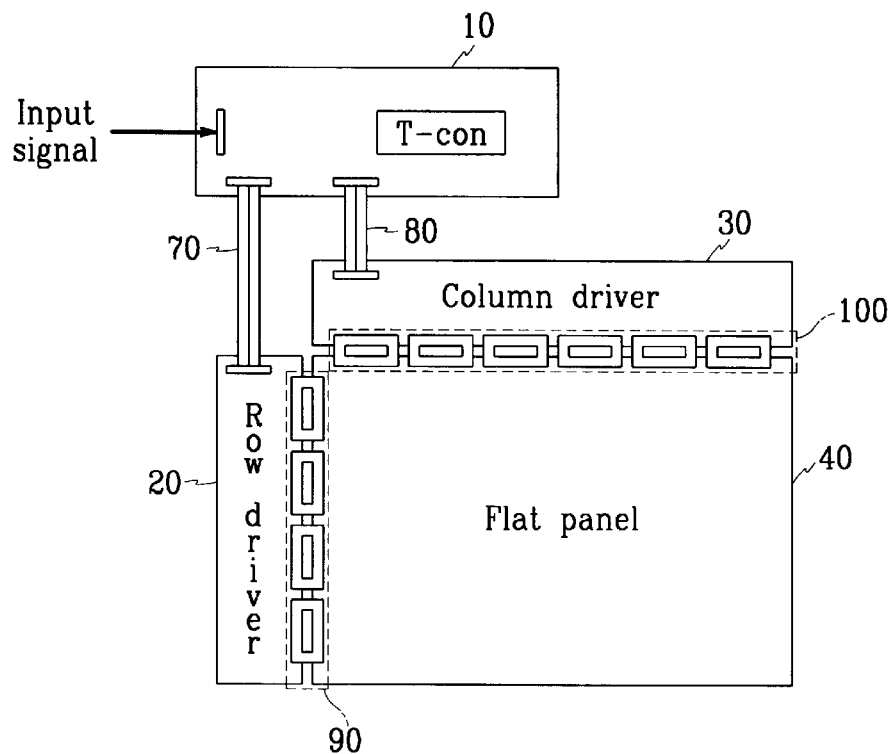
FIG. 2 is a schematic block diagram of a PCB module of FIG. 1.
Figure 3:
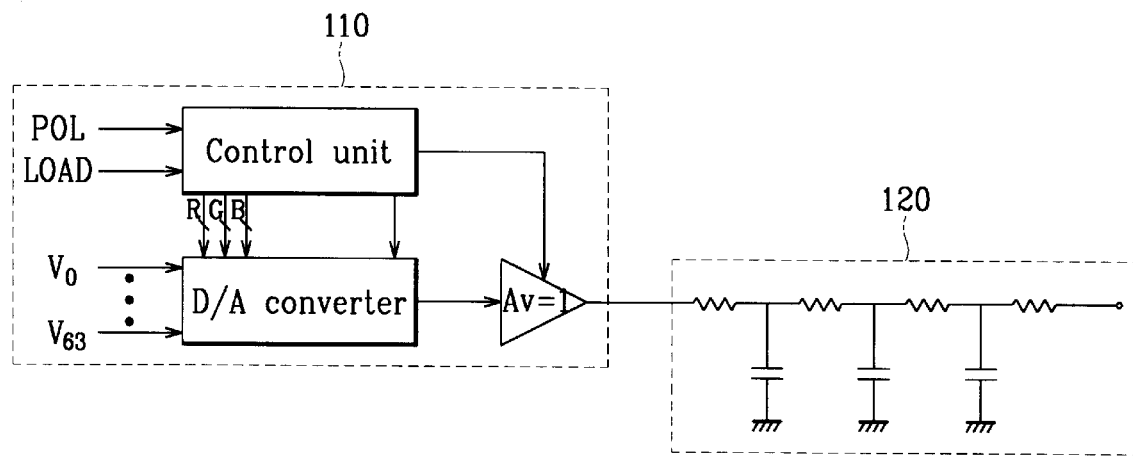
FIG. 3 is a schematic view of an output drive unit of a driver IC, which drives column signal wires of the conventional flat panel display of FIG. 1.
Figure 4:
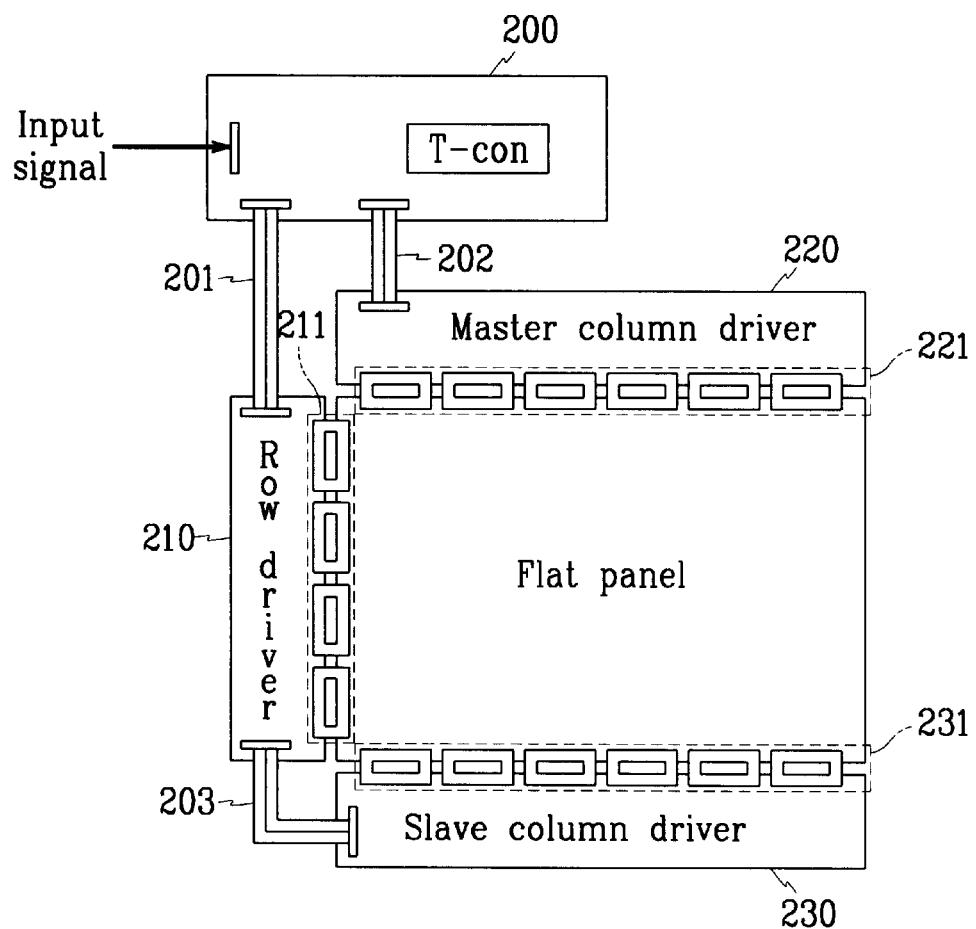
FIG. 4 is a schematic block diagram of a PCB module of a flat panel display, in which column signal wires of a flat panel are driven by a master drive output unit and a slave drive unit according to a first preferred embodiment of the present invention.

FIG. 4 shows a schematic block diagram of a PCB module of a flat panel display according to a first preferred embodiment of the present invention.

As shown in the drawing, a PCB module of a flat panel display according to a first preferred embodiment of the present invention includes a master PCB 200 for receiving R, G, B image data and synchronization signals, and processing the data and signals using a timing controller, which is a FPGA custom IC, and for processing and generating image data and various control signals in a manner suitable for the structure of a flat panel; a row driver PCB 210 with a row driver IC TAB 211 attached, the row driver PCB 210 supplying scanning signals to row signal wires according to row driver control signals received from the master PCB 200 through a FPC 201; a master column driver PCB 220 with a master column driver IC TAB 221 attached, the master column driver PCB 220 receiving image data and control signals processed in the master PCB 200 through a column FPC 202, and supplying the image data to column signal wires; and an slave column driver PCB 230.

Figure 5:
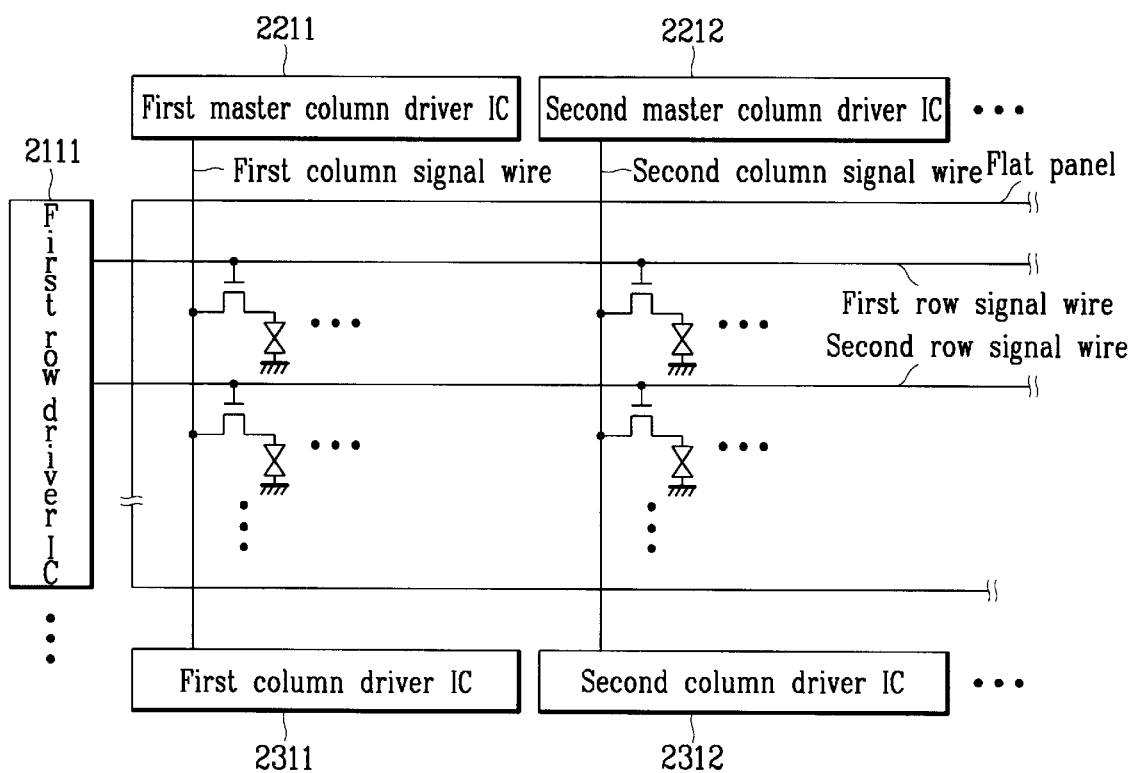
FIG. 5 is a schematic view of the flat panel driven by a master column driver and a slave column driver of FIG. 4.

With reference to FIG. 5, the row driver IC TAB 211 connected to the row driver PCB 210 includes first row driver ICs 2111. Here, the number of the first row driver ICs 2111 varies depending on the resolution. The ICs 2111 have a number of output ports corresponding to the row signal wires. Further, the master column driver IC TAB 221 connected to the master column driver PCB 220 includes first master column driver ICs 2211 and second master column driver ICs 2212. The number of the first master column driver ICs 2211 and second master column driver ICs 2212 varies depending on the resolution. The ICs 2211 and 2212 have a number of output ports corresponding the column signal wires. Finally, the slave column driver IC TAB 231 connected to the slave column driver PCB 230 includes first slave column driver ICs 2311 and second slave column driver ICs 2312. The number of the first and second slave column driver ICs 2311 and 2312 depends on the resolution, and the ICs 2311 and 2312 have a number of output ports corresponding to the number of the column signal wires. The slave column driver PCB 230 operates by control signals generated in the master PCB 200 and transmitted via the row driver FPC 201, row driver PCB 210, and a slave FPC 203.

Figure 6:
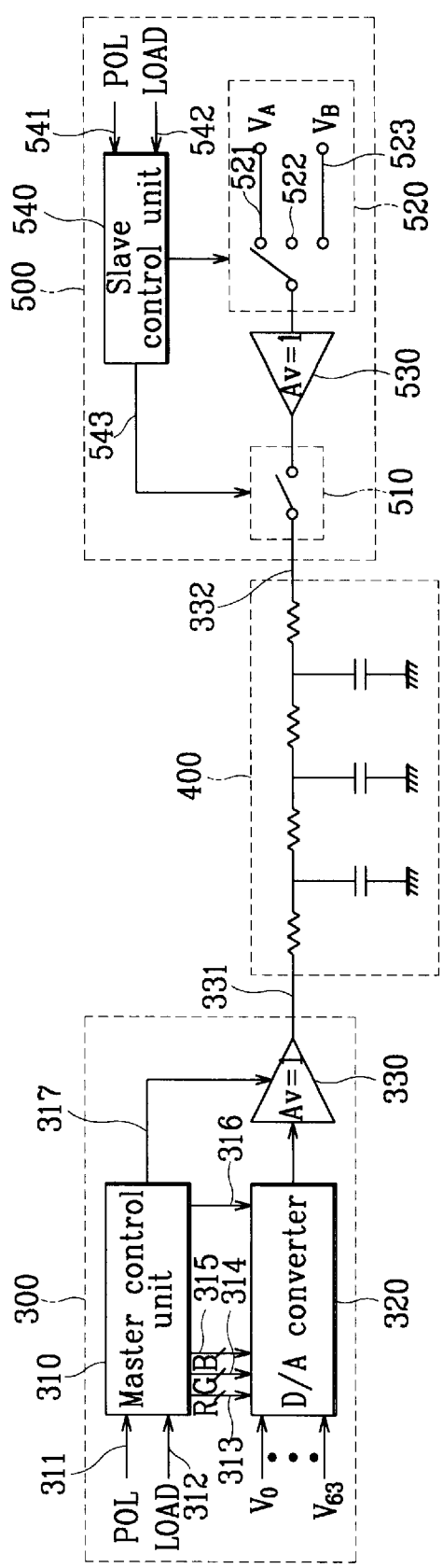
FIG. 6 is a schematic view of the master drive output unit and the slave drive unit for driving the column signal wires according to the first preferred embodiment of the present invention.

FIG. 6 shows a schematic view of a master drive output unit 300 and an slave drive unit 500 for driving the column signal wires (identified by reference numeral 400 in the drawing) of the flat panel display, which is driven by the master column driver 220 and the slave column driver 230 as described above, according to the first preferred embodiment of the present invention. It is to be understood that the single column signal wire 400 of FIG. 6 is one example of the many column signal wires described with reference to FIG. 5. Further, the master drive output unit 300 in FIG. 6 is a simplified depiction of one of the output terminals comprising an internal structure of the master column driver IC TAB 221, and the slave drive unit 500 in FIG. 6 is a simplified depiction of one of the terminals comprising an internal structure of the slave column driver IC TAB 231. The slave drive unit 500 is used in case the master drive output unit 300 is unable to sufficiently transmit signals to the column signal wire 400.

The master drive output unit 300 includes a master control unit 310, a D/A converter 320, and a master buffer amp 330. The master control unit 310 operates by control signals generated in a timing controller, which is installed in the master PCB 200, and outputs control signals 316 and 317 at predetermined times to enable the output of signals by the D/A converter 320 and the master buffer amp 330. Here, the output of signals at predetermined times refers to the output of the control signals 316 and 317 at times suitable for the resolution of the flat panel display according to polarity signals 311, which control polarity, and load signals 312, which enable D/A conversion and transmission.

The D/A converter 320, which is typically required at an output terminal of the master column driver IC TAB 221, receives gray voltages (V0~V63) that are input according to the control signals 316 of the master control unit 310 to correspond to gray levels of colors to be formed. The D/A converter 320 then converts R, G, B digital image data 313, 314 and 315 to appropriate analog image signals. The master buffer amp 330, according to the control signals 317 of the master control unit 310, converts an image output voltage of the D/A converter 320 to a signal having the same voltage but amplified by a predetermined current gain, which is selected to correspond to characteristics of the panel, then outputs the signal to the column signal wire 400.

The slave drive unit 500 includes an on/off switch 510, a three-state buffer converter 520, a slave buffer amp 530, and a slave control unit 540. The on/off switch 510 shorts or opens according to control signals received from the slave control unit 540 to either transmit or cut-off the transmission of output signals of the slave buffer amp 530.

The three-state buffer converter 520, according to control signals received from the slave control unit 540, transmits one of three voltages to the slave buffer amp 530. The three voltages include two different DC voltages and one floating non-voltage. It is also possible to structure the three-state buffer converter 520 including a double contact converter and a single contact converter. The slave buffer amp 530 converts signals received from the three-state buffer converter 520 to signals with the same voltage but amplified by a predetermined gain, then transmits the converted signals to the on/off switch 510.

The slave control unit 540 operates by receiving the control signals generated by the timing controller, which is installed in the master PCB 200. The slave control unit 540 outputs control signals at predetermined times such that the on/off switch 510 shorts or opens, and the three-state buffer converter 520 selects one of the three voltages. It is also possible for the control signals used to operate the on/off switch 510 and the three-state buffer converter 520 to be directly generated in the timing controller of the master PCB 200. The predetermined times at which the control signals are output, refer to the output of the control signals at times suitable for the resolution of the flat panel display according to polarity signals 541, which control polarity, and load signals 542, which enable D/A conversion and transmission.

Figure 7:
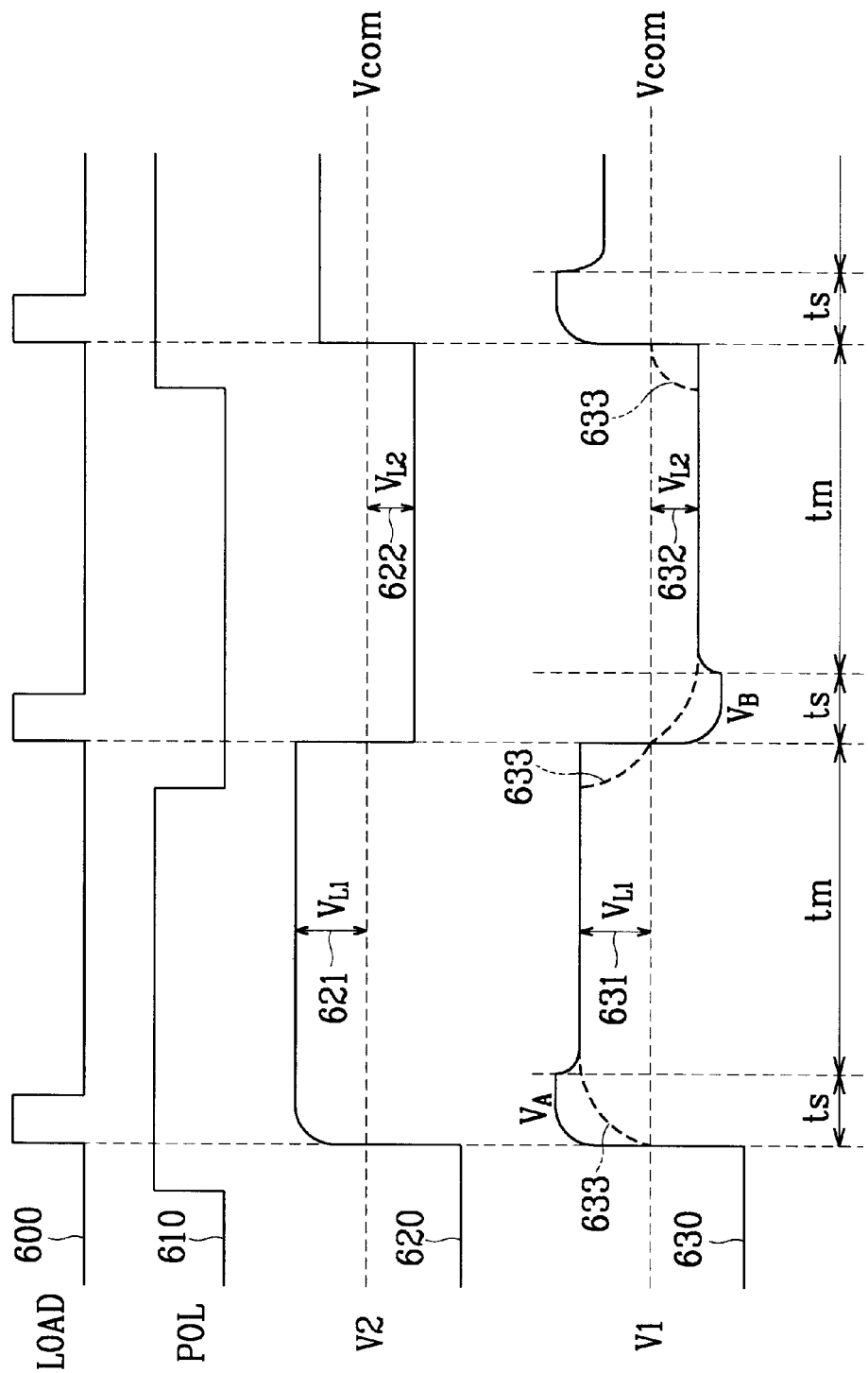
FIG. 7 is a signal wave diagram for describing an operation of the elements of FIG. 6.

FIG. 7 shows a signal wave diagram for describing an operation of the master drive output unit 300 and the slave drive unit 500, which drive the row signal wire and the column signal wire 400 of the flat panel display.

With reference to the drawing, according to a polarity determination signal (POL) 610 and an output determination signal (LOAD) 600 respectively input to signal input points 311 and 312 of the master drive output unit 300 and signal input points 541 and 542 of the slave drive unit 500. The master control unit 310 performs control such that the master buffer amp 330 of the master drive output unit 300 outputs image signals to the column signal wire 400, and the slave control unit 540 performs control such that the on/off switch 510 of the slave drive unit 500 shorts to enable output signals of the slave buffer amp 530 to be output to the column signal wire.

At this time, the master buffer amp 330 outputs an image signal VL1 621 to the column signal wire 400, the three-state buffer converter 520 is at a first contact point 521 such that a DC voltage VA is transmitted to the slave buffer amp 530. The DC voltage VA is amplified by the slave buffer amp 530 and output to the column signal wire 400. Here, if a voltage gain of the slave buffer amp 530 is set as a unit gain, the voltage output is identical to VA, and a current drive capacity is amplified by as much as the gain GA such that a maximum output current capacity increase to VA*GA. Also, if the current amplification gain of the slave buffer amp 530 is made large enough, the voltage generated in the column signal wire 400 is either slightly reduced as a result of transmission line characteristics, or a voltage V2 of a point 331 close to the master buffer amp 330 equals VL1 and a voltage V1 of a point 332 close to the slave buffer amp 530 equals VA in the case where an output impedance of the master buffer amp 330 is sufficiently small.

Next, if the three-state buffer converter 520 moves to a second contact point 522 according to the control signals of the slave control unit 540, an input current of the slave buffer amp 530 becomes 0 and an output converts to a high impedance having no output current, since a voltage is applied through a floating non-voltage and an impedance is infinitely large. At this time, since the image signal VL1 621 output to the column signal wire 400 by the master buffer amp 330 appears as is, the voltage V1 of the point 332 close to the slave buffer amp 530 equals VL1.

If the three-state buffer converter 520 moves to a third contact point 523 according to the control signals of the slave control unit 540, the voltage V1 of the point 332 close to the slave buffer amp 530 equals VB for the same reasons as described above. If the above consecutive operations correspond to times at which the contact points of the three-state buffer converter 520 move and are displayed in a waveform diagram as in FIG. 7, a V2 voltage waveform 620 is maintained at VL1, a V1 voltage waveform 630 varies from VA to VL1 and VB according to the contact point position, and the V2 voltage waveform 620 changes from VL1 to VL2 according to the contact point position.

In the above, even when the three-state buffer converter 520 changes from the third contact point 523 back to the second contact point 522, since the master buffer amp 330 outputs a new image signal VL2 622 as is, ultimately V1=V2=VL2 and the voltage waveforms 620 and 630 of V1 and V2 are as shown in FIG. 7.

In order to apply the above operational principles to compensate for drive signal distortion in a flat panel display, the timing in the movement of the contact points of the three-state buffer converter 520 and either the point of polarity conversion of the drive signals or the point where the image output signals are applied must coincide. That is, the moment at which drive signal power is required varies according to resolution, and more particularly, the moment of movement of the contact points must coincide with the moment when a large power is required at the drive signals. Then the six waveforms, using as an example the operation of the increasingly-widespread flat panel display-the TFT-LCD, are operational waveforms realizing drive signal compensation effects according to the moment of conversion of the contact points with respect to a common electrode signal Vcom. If an initial contact point setting signal POL 541 and an output initiating signal LOAD 542 are applied to the slave control unit 540, which controls an initial contact point position, contact point sustain time, a contact point movement, and a contact point sustain time are determined in the slave control unit, compensation of distorted image signals according to a delay time existing intrinsically in signal wires such as the column signal wire 400 is realized as a result of operational principles of the three-state buffer converter 520 and the slave buffer amp 530.

In particular, with reference to FIG. 4, the master column driver IC TAB 221 is connected to one side of the column signal wire 400, and the slave column driver IC TAB 231 is connected to another side of the column signal wire. In the case where the signals (POL and LOAD) controlling the output initiation and output polarity of the master column driver IC TAB 221 are supplied simultaneously to the slave column driver IC TAB 231, occurring at the same time as the output of the image signals (VL1 and VL2), which are generated by the master column driver IC TAB 221 and meant to be applied to pixels, a voltage (VA or VB) having a polarity identical to the drive signals of the master column driver IC TAB 221 is generated in the slave column driver IC TAB 231. After this voltage is maintained for a duration designated according to resolution by the timer of the master control unit 310 and the slave control unit 540, a high impedance state occurs according to the movement of the contact points of the three-state buffer converter 520 such that a drive voltage of a screen end terminal 332 is quickly reverted to a suitable image signal (VL1 or VL2) from a voltage (VA or VB).

Accordingly, if the voltage applied to the screen end terminal 332 is compared to the drive signals normally generated in the master column driver IC TAB 221, increased or decreased portions, caused by voltage waveform polarities to which severe distortion is generated by inherent load (signal wire resistance and stray capacity) of the column signal wire 400, are compensated, minimizing the distortion time. In the V1 voltage waveform 630 of FIG. 7, the dotted line 633 shows where image signals are not sufficiently charged because of inherent load when the slave drive unit 500 does not compensate the image signal.

Figure 8:
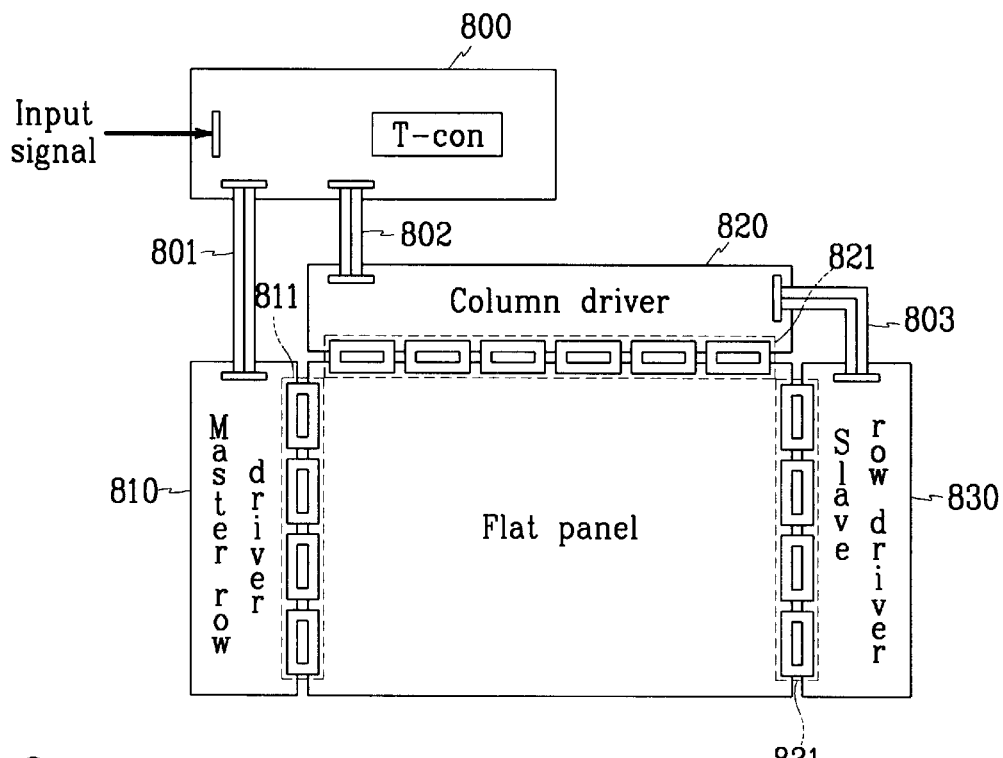
FIG. 8 is a schematic block diagram of a PCB module of a flat panel display, in which column signal wires and row signal wires of a flat panel are driven by a master drive output unit and an slave drive unit according to a second preferred embodiment of the present invention.

FIG. 8 shows a schematic block diagram of a PCB module of a flat panel display according to a third preferred embodiment of the present invention. In the third embodiment, the slave drive unit 500 compensates a row signal wire.

As shown in the drawing, a PCB module of a flat panel display according to a third preferred embodiment of the present invention includes a master PCB 800 for receiving R, G, B image data and synchronization signals, and processing the data and signals using a timing controller, which is a FPGA custom IC, and for processing and generating image data and various control signals in a manner suitable for the structure of a flat panel. It has a master row driver PCB 810 with a master row driver IC TAB 811 attached. The row driver PCB 810 supplies scanning signals to row signal wires according to row driver control signals received from the master PCB 800 through an FPC 801. It also includes a column driver PCB 820 with a column driver IC TAB 821 attached. The column driver PCB 820 receives image data and control signals processed in the master PCB 800 through a column FPC 802 and supplies the image data to column signal wires. It has a slave row driver PCB 830, too. The number of the master row driver IC TAB 811 and column driver IC TAB 821 depends on the resolution. The driver IC TABs have a number of output ports corresponding to row signal wires and column signal wires.

The slave row driver PCB 830 operates according to control signals generated in the master PCB 800 and transmitted through the column FPC 802, the column driver PCB 820, and a slave FPC 803. In order to compensate output signals of the master row driver IC TAB 821 connected to the master row driver PCB 810, there is provided an slave drive unit 500 (described in the first embodiment) in the slave row driver PCB 830. Also, the number of the slave row driver IC TAB 831 connected to the slave row driver PCB 830 depends on the resolution of the display. The slave row driver IC TAB 831 has a number of output ports corresponding to row signal wires.

Figure 9:
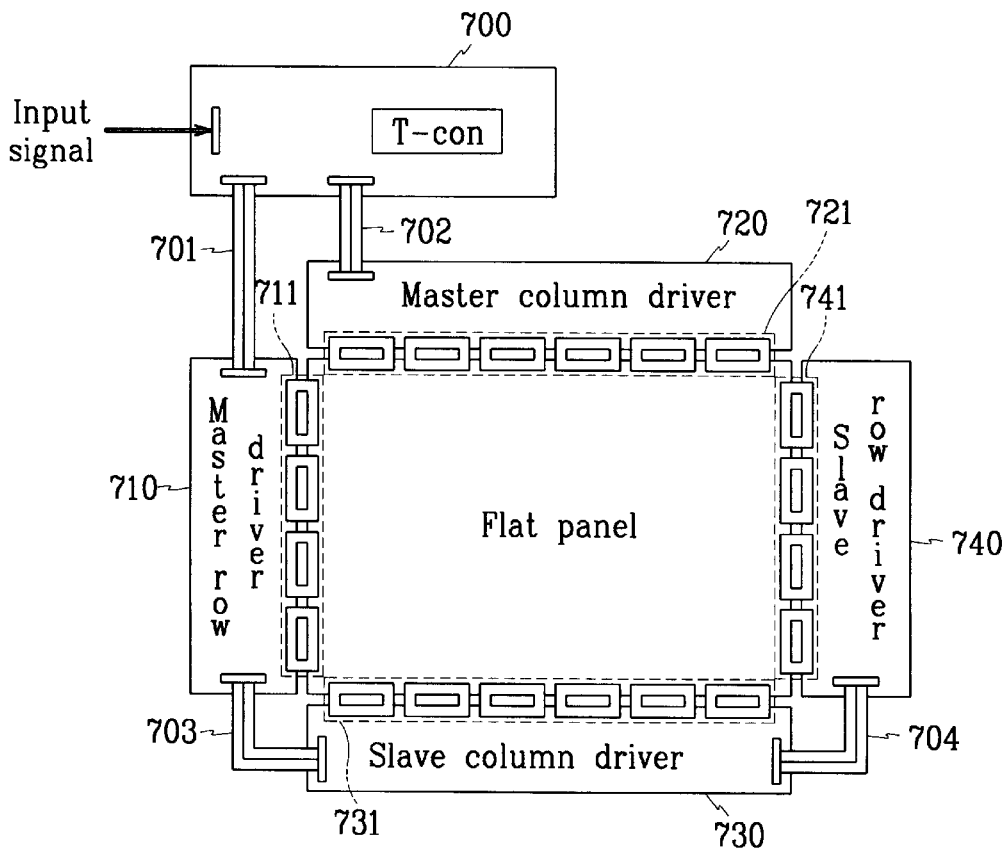
FIG. 9 is a schematic block diagram of a PCB module of a flat panel display, in which row signal wires of a flat panel are driven by a master drive output unit and an slave drive unit according to a third preferred embodiment of the present invention.

FIG. 9 shows a schematic block diagram of a PCB module of a flat panel display according to a second preferred embodiment of the present invention. Here, a slave drive unit also compensates a row signal wire. This will be described in more detail below.

As shown in the drawing, a PCB module of a flat panel display according to a second preferred embodiment of the present invention includes a master PCB 700 for receiving R, G, B image data and synchronization signals, and processing the data and signals using a timing controller, which is a FPGA custom IC, and for processing and generating image data and various control signals in a manner suitable for the structure of a flat panel. It has a master row driver PCB 710 with a master row driver IC TAB 711 attached. The row driver PCB 710 supplies scanning signals to row signal wires according to row driver control signals received from the master PCB 700 through a FPC 701. A master column driver PCB 720 with a master column driver IC TAB 721 attached is included. The master column driver PCB 720 receives image data and control signals processed in the master PCB 700 through a column FPC 702, and supplies the image data to column signal wires. It has a slave row driver PCB 740 and a slave column driver PCB 730. The number of the master row driver IC TAB 711 and master column driver IC TAB 721 varies depending on resolution. They have a number of output ports suitable for a number of row signal wires and column signal wires.

The slave column driver PCB 730 operates according to control signals generated in the master PCB 700 and transmitted through the row FPC 701, the master row drive PCB 710, and a first slave FPC 703. The slave row driver 740 operates by control signals generated in the master PCB 700 and transmitted through the row FPC 701, the master row driver PCB 710, the first slave FPC 703, the slave column driver PCB 730, and a second slave FPC 704. In order to compensate output signals of the master row driver IC TAB 711 and the master column driver IC TAB 721 connected respectively to the master row driver PCB 710 and the master column driver PCB 720, there is provided an slave drive unit 500 (described in the first embodiment) in the slave row driver PCB 740 and the slave column driver PCB 730. Also, a number of the slave row driver IC TAB 741 and the slave column driver IC TAB 731 connected respectively to the slave row driver PCB 740 and the slave column driver PCB 730 varies according to resolution, and have a number of output ports suitable for a number of row signal wires and column signal wires.

In the above embodiments, the slave FPCs (203, 703, 704, 803) transmitting the control signals for operating the slave row driver ICs (411, 511) or the slave column driver ICs requires significantly less signal wires than the FPCs required in the conventional dual drive method. In order to prevent the distortion of horizontal signals using conventional dual scan or dual drive methods, the master drive output unit 300 must be provided to both sides of the signal wires of the flat panel display, and the signals enabling two master drive output units 300 to operate precisely at the same time must be supplied simultaneously to both sides of the signal wires. Accordingly, the drive circuit becomes at least twice larger. Further, in large screen displays with a higher resolution and multi-gray levels, it causes significant disturbance (crosstalk) between signals and increased power consumption as well as the generation of EMI (electromagnetic interference), since signals must be transmitted through a relatively long distance in order to drive the master drive output units 300 on both sides of the signals wires.

However, the master drive output unit 300 and the slave drive unit 500 of the present invention decreases the number of signals to be applied to the slave drive unit 500 to 2–3 signals, and requires only two direct voltages for the compensation signals. As a result, the number of signal wires is reduced by at least 90% compared to the convention dual drive method, achieving the same drive signal compensation effects.

In the flat panel display of the present invention, with the compensation of the output signals of the master drive output unit 300 by the slave drive unit 500, normal scan signals or image signals can be transmitted to the signal wires in the large screen and high resolution flat panel display. That is, in order to charge the output signals of the master drive output unit 300 easily, the slave drive unit 500 supplies and charges compensation signals to the arrangement of the corresponding signal wires before the output signals of the master drive output unit 300 are charged, and the master drive output unit 300 generates output signals to drive pixels and supplies the output signals to the corresponding signal wire arrangements.

Further, in driving a large screen, high resolution flat panel display, since signal distortion caused by inherent RC delay cannot be sufficiently compensated by the master drive output unit of the driver IC, images do not appear normally. With the slave drive unit of the present invention, however, compensation is made possible as described above. As a result, normal image output is realized by significantly reducing signal delay and distortion without the complicated structure and high costs associated with conventional dual scan or dual drive methods.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A flat panel display, comprising:
    a flat panel including a signal wire arrangement for transmitting image drive signals to pixels, a row signal wire arrangement for transmitting scanning signals, and a column signal wire arrangement for transmitting image signals;
    a master drive output unit installed on the flat panel, the master drive output unit generating output signals for driving pixels and supplying the output signals to a corresponding signal wire arrangement; and
    a slave drive unit installed on the flat panel, the slave drive unit supplying compensation signals to the signal wire arrangement before the output signals of the master drive output unit are charged thereto, and thereby enabling the output signals of the master drive output unit to be easily charged, wherein the slave drive unit comprises:
        a slave control unit for generating an on/off switch control signals and a three-state buffer control signal and for outputting the control signals at predetermined times;
        an on/off switch that shorts or opens according to the on/off switch control signals;
        a three-state buffer converter for outputting one of a first voltage, a second voltage and a high-impedance state according to the three-state buffer control signals; and
        a slave buffer amp for converting signals received from the three-state buffer converter into signals of the same voltage but amplified by a predetermined current gain, and transmitting the converted signals to the on/off switch.

2. The flat panel display of claim 1, wherein the slave drive unit is one or more IC.

3. The flat panel display according to claim 1, wherein the on/off switch control signals and the three-state buffer control signal generated by the slave control unit are generated by a timing controller installed on a master PCB of a PCB module.

4. The flat panel display according to claim 1, wherein the first voltage and the second voltage of the three-state buffer converter include two different DC voltages.

5. A flat panel display, comprising:
    a flat panel including a signal wire arrangement for transmitting image drive signals to pixels, a row signal wire arrangement for transmitting scanning signals, and a column signal wire arrangement for transmitting image signals;
    a row-side master drive output unit installed on the flat panel, the row-side master drive output unit generating row-side output signals for driving pixels and supplying the row-side output signals to the row signal wire arrangement;
    a column-side master drive output unit installed on the flat panel, the column-side master drive output unit generating column-side output signals for driving pixels and supplying the column-side output signals to the column signal wire arrangement;
    a row-side slave drive unit installed on the flat panel, the row-side slave drive unit supplying compensation signals to the row-side signal wire arrangement before the output signals of the row-side master drive output unit are charged thereto, and thereby enabling the output signals of the row-side master drive output unit to be easily charged; and
    a column-side slave drive unit installed on the flat panel, the column-side slave drive unit supplying compensation signals to the column-side signal wire arrangement before the output signals of the column-side master drive output unit are charged to thereby enable the output signals of the column-side master drive output unit to be easily charged.

6. The flat panel display of claim 5, wherein the slave drive unit is one or more IC.

7. The flat panel display of claim 5, wherein the slave drive unit comprises:
    a slave control unit for generating an on/off switch control signals and a three-state buffer control signal and for outputting the control signals at predetermined times;
    an on/off switch that shorts or opens according to the on/off switch control signals;
    a three-state buffer converter for outputting one of a first voltage, a second voltage and a high-impedance state according to the three-state buffer control signals; and a slave buffer amp for converting signals received from the three-state buffer converter into signals of the same voltage but amplified by a predetermined current gain, and transmitting the converted signals to the on/off switch.

8. The flat panel display according to claim 7, wherein the on/off switch control signal and the three-state buffer control signals generated by the slave control unit are generated by a timing controller installed on a master PCB of a PCB module.

9. The flat panel display according to claim 7, wherein the first voltage and the second voltage of the three-state buffer converter include two different DC voltages.

10. A drive method for a flat panel display, the flat panel display including a signal wire arrangement for transmitting image drive signals to pixel electrodes of the flat panel display, a row signal wire arrangement for transmitting scanning signals, a column signal wire arrangement for transmitting image signals, and a master drive output unit and a slave drive unit for supplying image drive signals to one of the signal wire arrangements, the method comprising the steps of:

generating at least one on/off switch control signal for controlling an on/off switch;

generating at least one control signal for controlling a three-state buffer;

converting signals received from the three-state buffer into signals of same voltage but amplified by a predetermined current gain;

supplying the converted signals to a corresponding signal wire arrangement before the master drive output unit supplies output signals; and supplying output signals for the driving of pixels by the master drive output.

11. A drive method for a flat panel display, the flat panel display including a signal wire arrangement for transmitting image drive signals to pixel electrodes of the flat panel display, a row signal wire arrangement for transmitting scanning signals, a column signal wire arrangement for transmitting image signals, and a row-side master drive output unit and a row-side slave drive unit installed on a row-side and a column-side master drive unit and a column-side slave drive unit installed on a column-side and for supplying image drive signals to one of the signal wire arrangements, the method comprising the steps of:

supplying and charging row-side compensation signals by the row-side slave drive unit, the row-side compensation signals being supplied to the row signal wire arrangement before the output signals of the row-side master drive output unit are charged to thereby enable the output signals of the row-side master drive output unit to be easily charged;

generating and supplying by the row-side master drive output unit, row-side output signals for driving pixels following the supply of the row-side compensation signals, the row-side output signals being supplied to the row signal wire arrangement;

supplying and charging column-side compensation signals by the column-side slave drive unit, the column-side compensation signals being supplied to the column signal wire arrangement before the output signals of the column-side master drive output unit are charged thereto and thereby enabling the output signals of the column-side master drive output unit to be easily charged; and generating and supplying by the column-side master drive output unit, column side output signals for driving pixels following the supply of the column-side compensation signals, the column-side output signals being supplied to the column signal wire arrangement.

* * * * *